(12) United States Patent
Gaulier et al.

(10) Patent No.: US 12,264,707 B2
(45) Date of Patent: Apr. 1, 2025

(54) HYDRODYNAMIC BEARING FOR SUPPORTING A ROTATING ELEMENT, GEARBOX ACCOMMODATING SUCH A HYDRODYNAMIC BEARING, AND USE OF SUCH A HYDRODYNAMIC BEARING

(71) Applicant: Flender-Graffenstaden S.A.S., Illkirch-Graffenstaden (FR)

(72) Inventors: Thomas Gaulier, Illkirch-Graffenstaden (FR); Thomas Marmagne, Illkirch-Graffenstaden (FR)

(73) Assignee: Flender-Graffenstaden S.A.S., Illkirch-Graffenstaden (FR)

( * ) Notice: Subject to any disclaimer, the term of this patent is extended or adjusted under 35 U.S.C. 154(b) by 0 days.

(21) Appl. No.: 18/699,817

(22) PCT Filed: Oct. 10, 2022

(86) PCT No.: PCT/EP2022/078031
§ 371 (c)(1),
(2) Date: Apr. 9, 2024

(87) PCT Pub. No.: WO2023/066696
PCT Pub. Date: Apr. 27, 2023

(65) Prior Publication Data
US 2024/0328457 A1  Oct. 3, 2024

(30) Foreign Application Priority Data
Oct. 20, 2021  (EP) ..................................... 21203612

(51) Int. Cl.
*F16C 33/10* (2006.01)
*F16C 17/02* (2006.01)

(52) U.S. Cl.
CPC ........ *F16C 33/1065* (2013.01); *F16C 17/022* (2013.01); *F16C 33/1045* (2013.01); *F16C 2361/65* (2013.01)

(58) Field of Classification Search
CPC .... F16C 17/02; F16C 17/022; F16C 33/1045; F16C 33/1065; F16C 2361/65
See application file for complete search history.

(56) References Cited

U.S. PATENT DOCUMENTS 3,011,838 A  12/1961  Love
9,512,871 B2 * 12/2016  Roberts, Jr. ........... F16C 17/022
(Continued)

FOREIGN PATENT DOCUMENTS

DE   456 041    2/1928
DE   21 00 365  7/1972
(Continued)

OTHER PUBLICATIONS

International Search Report issued on Nov. 11, 2022 by the European Patent Office in International Application PCT/EP2022/078031.

*Primary Examiner* — James Pilkington
(74) *Attorney, Agent, or Firm* — Henry M. Feiereisen LLC

(57) ABSTRACT

A hydrodynamic bearing for accommodating and supporting a rotating element includes an unloaded sliding surface, a loaded sliding surface downstream of the unloaded sliding surface, a first injection pocket arranged within the unloaded sliding surface and a second injection pocket arranged within the loaded sliding surface. A radial recess arranged within the unloaded sliding surface and the loaded sliding surface extends in a circumferential direction such as to overlap the first and second injection pockets in the circumferential direction upstream and downstream. The radial recess defines or delimits an active area of the unloaded and (Continued)

loaded sliding surfaces. Each of the first and second injection pockets has an axial length which is smaller than an axial extension of the active area upstream or downstream in a corresponding circumferential sliding section of the unloaded sliding surface and loaded sliding surface in which the first and second injection pockets respectively are arranged.

17 Claims, 10 Drawing Sheets

(56) References Cited

U.S. PATENT DOCUMENTS

| | | | |
|---|---|---|---|
| 9,841,055 | B2 | 12/2017 | Giberson |
| 10,197,095 | B2 * | 2/2019 | Althaus ................. F16C 17/022 |
| 10,443,651 | B2 | 10/2019 | Gaulier et al. |
| 10,533,602 | B2 * | 1/2020 | Fuchs ................... F16C 17/022 |
| 2003/0081867 | A1 | 5/2003 | Weissbacher |
| 2010/0054642 | A1 | 3/2010 | Issler |

FOREIGN PATENT DOCUMENTS

| | | |
|---|---|---|
| DE | 31 17 746 A1 | 12/1982 |
| DE | 36 21 577 A1 | 2/1987 |
| DE | 37 06 571 A1 | 9/1988 |
| DE | 199 27 807 A1 | 12/2000 |
| DE | 101 60 804 C1 | 10/2002 |
| DE | 102008039741 A1 | 3/2010 |
| EP | 1 278 966 B1 | 3/2005 |

* cited by examiner

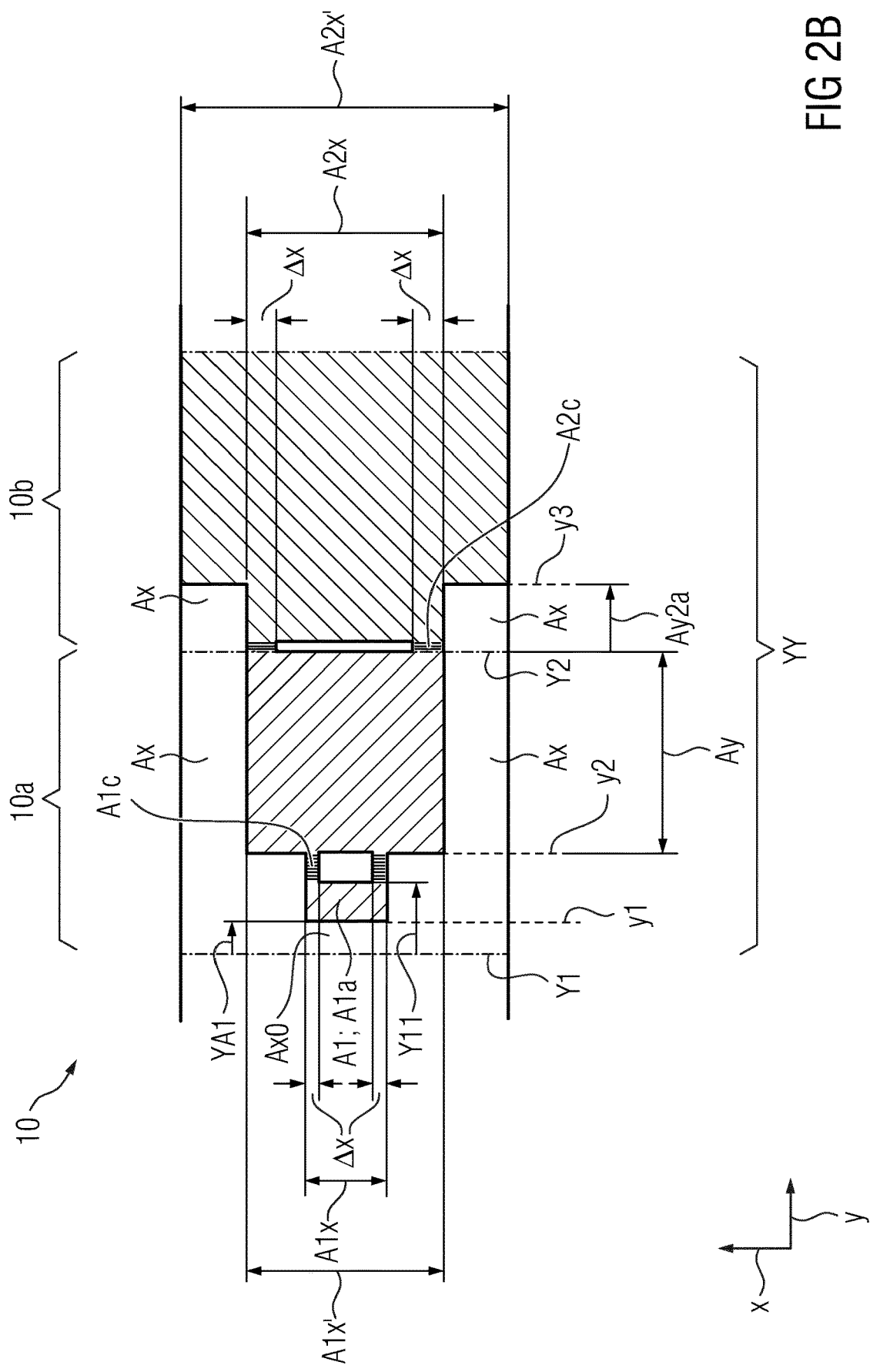

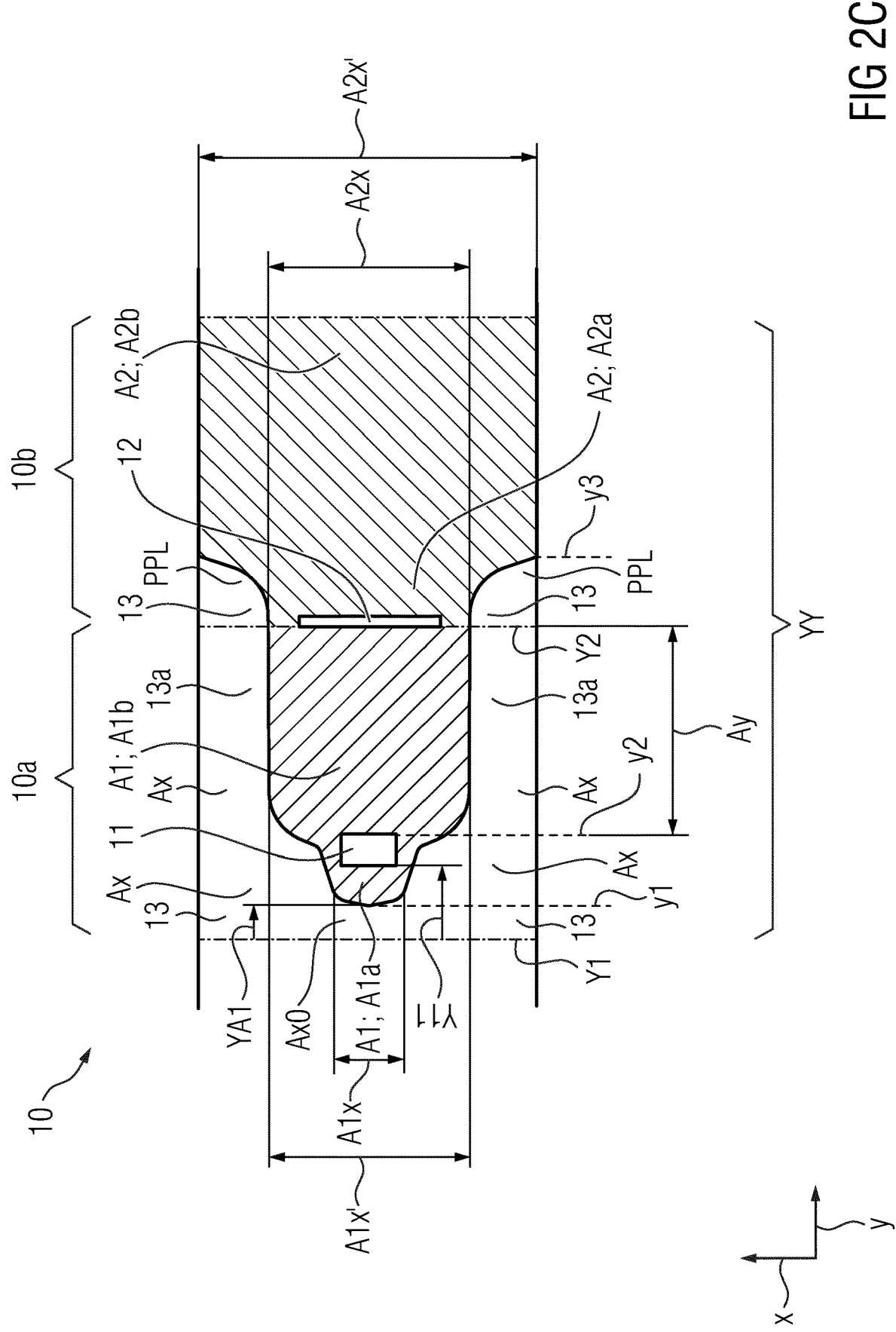

_(US 12,264,707 B2)_

HYDRODYNAMIC BEARING FOR SUPPORTING A ROTATING ELEMENT, GEARBOX ACCOMMODATING SUCH A HYDRODYNAMIC BEARING, AND USE OF SUCH A HYDRODYNAMIC BEARING

CROSS-REFERENCES TO RELATED APPLICATIONS

This application is the U.S. National Stage of International Application No. PCT/EP2022/078031, filed Oct. 10, 2022, which designated the United States and has been published as International Publication No. WO 2023/066696 A1 and which claims the priority of European Patent Application, Serial No. 21203612.3, filed Oct. 20, 2021, pursuant to 35 U.S.C. 119(a)-(d).

TECHNICAL FIELD

The present invention refers to a high efficiency and high dynamic stability hydrodynamic bearing (especially hydrodynamic journal bearing) for accommodating and supporting a rotating element, the hydrodynamic bearing exhibiting at least one unloaded sliding surface and at least one loaded sliding surface downstream of the unloaded sliding surface, wherein the hydrodynamic bearing exhibits a first injection pocket arranged within the unloaded sliding surface and a second injection pocket arranged within the loaded sliding surface. In particular, the present invention refers to hydrodynamic bearing for turbo applications especially in gearboxes. The present invention also refers to a gearbox exhibiting at least one such hydrodynamic bearing as well as to the use of such a hydrodynamic bearing.

BACKGROUND OF THE INVENTION

In the field of high speed, high-power and high efficiency gearboxes, there is a need to guide in rotation the shafts of e.g. a power train, especially in so called turbo gearboxes. Such gearboxes usually exhibit high loads, and high radial forces are exerted on the respective bearing (usually hydrodynamic journal bearing resp. plain bearing), wherein the direction of force may vary between no-load and full load conditions. In comparison with turbomachines such as steam or gas turbines, the forces in turbo gearboxes are even higher. Further, usually, there is a high journal velocity (especially >60 m/s), and usually there is high power loss; in particular, power loss may be proportional to [journal velocity]exp3.

It has been found that high efficiency bearings preferably should ensure low/minimal power losses both at full load and at no load. In some markets resp. for some arrangements or systems, there is a requirement for gearbox efficiency even greater than 99% at full speed and full load. In that context, a strong requirement is that for dynamic stability both at start up and in stabilized operation, i.e., no fluid instability at all may be acceptable. Also, there is a need for high reliability, thus, maximum temperature and maximum pressure should not exceed a predefined limit depending on materials of such bearings, e.g. for white metal material. With increasing loads and rotational speed, that requirement becomes even more severe also in view of safety factors.

The functioning and the bearing characteristics is/are dependent on lubrication and injection of fluid between the bearing surface and the rotating element (shaft). Previously known hydrodynamic bearings exhibit, e.g., large axial pockets which are provided over the whole length of the bearing. Such a design may ensure low power losses at full load and no load, but at full load, high pressures and high temperatures as well as dynamic stability issues may arise. In particular, dynamic stability issues may mainly arise during startup (fairly high speed but only low loads). In such a design, for each sliding surface, there is a pressure zone with a discharge zone upstream and another one downstream.

Alternatively, previously known hydrodynamic bearings exhibit, e.g., small axial pockets which extend over the whole length of the bearing, and these axial pockets are provided in conjunction with radial recesses which extend in circumferential direction and which are mainly limited to the unloaded sliding surface of the hydrodynamic bearing, as described e.g. in WO 2017/092903 A1: At the entry/beginning of the sliding surface, fluid/oil flow is deflected to both sides (lateral areas) of the hydrodynamic bearing and can be guided to a discharge recess being arranged directly upstream of an axial pocket such that friction can be minimized. Such a design may allow for favorable low power losses at full load and for favorable fluid flow, but, in some specific applications, some power losses at no load may probably not be prevented effectively, and it seems as if there is further optimization potential in view of dynamic stability.

According to a further (older) design concept, a hydrodynamic bearing may also exhibit two relatively large and deep radial chambers being arranged vis-à-vis and allowing for decompression, as e.g. shown in US 2003/081867 A1; such a design may be favorable especially in view of static loads, but, it has been found that such a design may probably not be preferred in context with high dynamic stability and stiffness requirements in the field of high speed, high-power and high efficiency gearboxes.

Publication document DE 21 00 365 A1 describes a bearing comprising channels redirecting oil or grease, which is fed via central openings, in surface areas further downstream, by absorbing the oil/grease in circumferentially extending channels, wherein the pattern/muster of the channels recurs at least once in circumferential direction downstream before reaching further oil feeding openings.

In view of these examples in prior art, a common way to tackle dynamic stability problems in hydrodynamic journal bearings is still based on applying the so called "pressure dam" technique: an injection pocket is machined/designed specifically in order to provide for a sudden change of clearance on a portion of the bearing's length. This sudden change of clearance creates a pressure peak in the corresponding area of the fluid film, the pressure peak helping to settle the position of the shaft in the bearing. However, it has been found that this approach does not allow for thoroughly eliminating all dynamic instabilities problems, at least as far as applications as described above (especially turbo applications) are concerned; also, this approach does not allow for overcoming some other drawbacks such as increased/unfavorable power loss and increased/unfavorable oil flow rate. Thus, there is a need for a new approach for further optimizations of hydrodynamic bearing design which allows for very good dynamic stability and stiffness and at the same time which also allows for very good efficiency (minimized power losses).

DESCRIPTION OF THE INVENTION

Starting from this situation, it is an object of the present invention to provide a hydrodynamic bearing exhibiting favorable dynamic performance in high load and high speed conditions, especially both in start-up operation (starting sequence) and in stabilized operation (continuous running). In particular, it is an object of the present invention to provide such a hydrodynamic bearing in a specific design adapted/configured for turbo gearboxes and providing favorable efficiency also.

The object of the invention is solved by the features of the independent main claims. Advantageous features are indicated in the subclaims. If technically possible, the teachings of the subclaims can be combined arbitrarily with the teachings of the main and subclaims.

In particular, the object is therefore solved by a hydrodynamic bearing for a rotating element, exhibiting at least one unloaded sliding surface and at least one loaded sliding surface downstream (in the sliding direction resp. circumferential direction) of the unloaded sliding surface, wherein the hydrodynamic bearing exhibits a first injection pocket arranged within the unloaded sliding surface and a second injection pocket arranged within the loaded sliding surface, each for injecting fluid between the rotating element and respectively one of the sliding surfaces, wherein the hydrodynamic bearing exhibits at least one radial recess being arranged within both the unloaded sliding surface and the loaded sliding surface and extending in circumferential direction and overlapping both the first injection pocket and the second injection pocket in circumferential direction both upstream and downstream, wherein the at least one radial recess defines or delimits a/the active area of both the unloaded sliding surface and the loaded sliding surface, wherein the first injection pocket and the second injection pocket each have an axial length which is smaller than an axial extension of the active area upstream or downstream in the corresponding circumferential sliding section of the unloaded/loaded sliding surface in which the injection pockets respectively are arranged, especially smaller about at least factor 0.9 to 0.4. Such a configuration also allows for realizing a plurality of the desired advantages (especially hydrodynamic advantages) as described in the present disclosure, especially in context with high efficiency requirements.

In other words: The present invention refers to hydrodynamic (journal) bearings which allow for low power loss for both no load and full load conditions. In particular, a plurality of sliding surfaces resp. different active areas of pressure are provided by the unloaded and loaded surfaces, wherein the active areas of pressure can be defined by both the relative position of the injection pocket(s) and the relative position of the at least one radial recess.

It has to be noted that the sliding surfaces described in the present disclosure can be fixed or moving in a/the respective bearing shell.

In particular, the present invention refers to hydrodynamic bearings for gearboxes which are characterized by high radial loads. These radial loads usually point in a direction different from effective force of gravity, i.e., at the machine start up, the load on the bearing both increases in value and also changes in direction. The sliding surfaces of the bearing shall be called "loaded" or "unloaded" depending on whether they are opposed to the force applied on the shaft (rotating element) at full load, i.e., the loaded surfaces are the ones facing the force at full load (seen by the gearbox), and the unloaded surfaces are the other surfaces. Due to the change of load direction depending on the operational state (load direction substantially corresponding to gravitational forces in the resting state, and load direction pointing upwards in dynamic operational states), the unloaded surfaces might be the ones facing the load at the very beginning of the machine start up (which situation is not addressed by the wording "loaded" resp. "unloaded"), i.e., lower circumferential sections of the bearing. In other words: In a design in which the bearing is constituted by e.g. two bearing half shells, in dynamic operational states, the upper half shell is the shell coping with most of the load. According to the present invention, the second injection pocket preferably is arranged in an upper section (resp. shell) of the bearing.

According to the present invention, the active area of the unloaded sliding surfaces can be reduced, especially in order to allow for reducing fluid friction and power losses. In contrast, preferably, the active area of the loaded sliding surfaces is not reduced since this would increase both maximum temperature and maximum pressure (which could become a problem for the bearing's reliability, especially in view of white metal degradation).

The active area of the loaded sliding surface supports the radial load; therefore, the pressure of the fluid film on this surface is relatively high. However, this pressure is not constant on the whole surface; instead, the pressure profile according to the present invention preferably has a parabolic shape, with low-pressure zones at the beginning of the loaded sliding surface. Pressure is rather low on the corners/border of the sliding surface. It has been found that the active area can be cut out (recessed) in these corner/border areas in order to further reduce the total active area of the bearing and thus the power losses. Design/geometry of the active area can be defined by the at least one recess also.

It should be noted that according to the present invention the term "active area" specifically refers to those sections of the sliding surface which are not displaced/offset in radial direction, i.e., which are provided to define the intended sliding and contact area, and which also allow for high stiffness and stability. In contrast, any passive (inactive) area is characterized by a radial offset or clearance. In particular, such radial clearance of inactive areas can be much bigger, e.g. factor 3 to 10 bigger than any minor radial clearance of the active area, e.g. considerably bigger than any minor clearance at the active area. In particular, passive (inactive) areas, i.e., those areas and sections having a considerably bigger clearance than the active area, may also provide for evacuation of fluid. Thus, depending on (local) amount of fluid, the radial clearance can be designed individually for each surface section which shall not be part of the active area.

The at least one radial recess (especially discharge recess) has a surface offset radially outwards, i.e. a surface which is lower than the sliding surface (radially farther away from the rotating element/shaft), i.e. a surface having greater radial clearance that the active area. In particular, the whole surface of said radial recess extending in circumferential direction is arranged in a lower radial position than the sliding surface, i.e. at a radial position which is offset radially outwards.

The present invention allows for high dynamic stability. In particular, the present invention allows for preventing dynamic stability problems arising at certain speeds due to instabilities in fluid flow. It has been found that the following technical features, each of it or in combination, allow for limiting flow instabilities thus improving the bearing's dynamic stability:

Preferably, the oil injection pocket in the unloaded sliding surface is not arranged at the beginning of the unloaded sliding surface but further downstream (circumferential/angular offset). This allows for preventing any appearance of a cavitation zone in the middle of the unloaded sliding surface, thus, this allows for effectively preventing dynamic instabilities.

Preferably, a continuity area (no injection pocket within the respective circumferential section) is provided between the unloaded sliding surface and the loaded sliding surface. This allows for effectively using positive impact of the bearing preload on stability, and also for avoiding perturbations in oil/fluid flow, thereby further preventing instabilities.

Preferably, the bearing is designed with an enhanced preload and a reduced running clearance (taking into account thermal strain), which may also improve bearing stiffness and stability.

In particular, the present invention is based on the following concept and findings:

An optimized active area of the sliding surfaces can be defined by the at least one radial recess and the injection pocket(s), also considering the change in direction of radial load applied during the machine start up (e.g. a gearbox start up resp. the starting sequence of a power train), resulting in reduced power loss at both no load and full load conditions. Also, an optimized location of the oil/fluid injection pockets allows for minimizing both maximum pressure and temperature as well as for preventing the appearance of cavitation on large zones (especially on the whole length of the bearing), resulting in better reliability and less risk of dynamic instabilities.

In axial direction, the first and second injection pockets are provided only along an axial section of the whole length of the hydrodynamic bearing, i.e. not along the whole length of the sliding surface resp. not along the whole length of the hydrodynamic bearing.

Minimization of both maximum pressure and temperature as well as prevention of appearance of cavitation on large zones (especially on the whole length of the bearing) can also be realized based on optimized dimensions of the fluid injection pockets as described in the present disclosure, resulting in better reliability and reduced risks of dynamic instabilities.

The present invention also allows for optimized running clearance (taking into account thermal strain) and optimized preload, which also facilitates minimizing any risk of dynamic instabilities (especially also optimized balance between direct and cross-coupled stiffness), especially without using the so called "pressure dam" technique which in contrast causes an increase of power loss and oil flow rate and which may not drastically reduce dynamic instability in certain configurations (especially in specific speed/load ratios). Thus, the present invention teaches away from classic "pressure dam" technique, e.g. by providing for at least one radial recess circumferentially overlapping both the first and second injection pocket.

According to the present invention, the fluid flow through each of first and second injection pockets preferably is different. In particular, fluid flow rate through first injection pocket is only e.g. 10-30% of total pressurized fluid flow. In particular, fluid flow rate through first injection pocket is only e.g. 10-45% of fluid flow rate through second injection pocket. Such a distribution of throughput is favorable since the second injection pocket is facing most of the loads, especially in an arrangement above the rotating element.

It should be noted that according to the present invention the unloaded and loaded sliding surfaces can be provided by a half shell, respectively. Nonetheless, the term "surface" does not imply the surface to be provided by exactly one single element. Rather, any shell or housing of the hydrodynamic bearing can be provided by constructional elements which can be designed by the skilled person according to the specific design requirements of specific applications. Preferably, the first injection pocket is provided in a first half shell being arranged below the rotating element, and the second injection pocket is provided in a second half shell being arranged above the rotating element.

It should be noted that according to the present invention the term "injection pocket" specifically refers to fluid supply directly flowing/leading to a/the active area of the loaded/unloaded sliding surface, whereas the term "evacuation point" mentioned further below specifically refers to an outlet for fluid at an area which is different from active areas. In particular, at least one evacuation point may be arranged in the area of the at least one radial recess, i.e. in a radial position which is lower (radial clearance) than the radial position of the fluid outlet (i.e., inlet to the bearing) of the injection pocket(s). The term "circumferential" does not necessarily designate a whole circumference, but may only refer to the circumferential direction. Any extension in circumferential direction can be designated more specifically by referring to a specific value of angle (of circumference).

The present invention can be implemented in context with any rotating machine, especially those in which high journal velocity (in particular >60 m/s) and/or high radial loads occur. For example, the bearing described herein is configured e.g. for power generation applications and/or applications in oil and gas industry.

In the following, the advantageous aspects of the claimed invention are explained and further below, preferred modified embodiments of the invention are described. Explanations, in particular on advantages and definitions of features, are basically descriptive and preferred, but not limiting examples. If an explanation is limiting, this is expressly mentioned.

According to an embodiment of the invention, the active area of both the unloaded sliding surface and the loaded sliding surface(s) is defined or delimited by providing, at the at least one radial recess, a radial clearance which is at least factor 3 bigger than radial clearance of the active area. Such a difference in radial clearance may clearly define the active area and may facilitate the guiding of new and old fluid.

According to an embodiment of the invention, both the first and second injection pockets are arranged and configured for providing new fluid within the active area such that old fluid stream coming from circumferential sections further upstream is divided upstream of respective injection pocket and is directed to both lateral sides. Such a design also allows for relatively smooth transition from sections of old fluid to sections of new fluid, which is a concept clearly differing from so called "pressure dam" technique.

It should be noted that according to the present invention the term "new" fluid refers to fluid (especially pressurized fluid) being injected at the first and second injection pockets, and the term "old" resp. "used" fluid refers to fluid coming from circumferential sections further upstream, i.e., fluid which should be evacuated via inactive border areas, preferably via grooves.

According to an embodiment of the invention, upstream of the first injection pocket, the active area comprises a first unloaded sliding section, preferably having the shape of a rectangular land leading to the first injection pocket. Such a design may also favor relatively smooth lateral deviation and guiding of old fluid upstream of the first injection pocket.

According to an embodiment of the invention the first and second injection pockets are arranged and configured for axially deflecting old fluid for evacuation of said old fluid via the at least one recess in operational state, especially for evacuating the fluid exclusively in lateral/axial direction, wherein the old fluid is squeezed by new fluid injected via the first and second injection pockets. In other words: The hydrodynamic bearing is configured to provide for squeezing old fluid in axial direction to lateral border areas (resp. to the at least one radial recess resp. to the grooves) at two different circumferential points, but also allowing for intermixture at the border areas. It has been found that such a design and relative arrangement of the injection pockets and the at least one recess allows for high efficiency (especially due to unrestricted fluid circulation at minimized resistance/drag) and high stability and stiffness. In contrast to the "pressure dam" technique, old fluid may (at least slightly) pass the respective injection pocket, wherein axial deflection and evacuation is carried out continuously.

According to an embodiment of the invention, it is provided that the at least one radial recess, especially a respective groove arranged within the radial recess, is arranged laterally on both sides of the first and second injection pockets, with a/the respective groove overlapping at least the first injection pocket. This also allows for a favorable symmetric arrangement. A/the respective groove allows for advantageous fluid flow.

According to an embodiment of the invention the at least one radial recess is provided by one single coherent recess, especially by a recess extending over the whole length of the hydrodynamic bearing or sliding surface and exhibiting a U-shape in the circumferential sliding direction downstream and bordering at least the unloaded sliding surface and also partly the loaded sliding surface. This configuration also provides for favorable fluid/fluidic characteristics of/within the bearing.

According to the invention, the at least one radial recess provides for fluid communication between at least one evacuation point and the unloaded sliding surface. Such configuration also improves the ability of precisely predefining the manner of the oil flowing within the effective areas of the bearing, wherein the loaded sliding surface can be distinguished from the unloaded sliding surface in effective manner.

According to an embodiment of the invention the at least one radial recess provides for fluid communication between at least one evacuation point and the unloaded sliding surface, namely for/via a plurality of evacuation points on both lateral sides of a/the active area of the unloaded sliding surface. This also allows for further influencing the fluid/fluidic characteristics of/within the bearing.

According to an embodiment of the invention, in conjunction with the at least one recess, the relative position of first injection pocket within the unloaded sliding surface defines a duplicate (double/duplex) U-shaped arrangement of a frontal section of the radial recess encompassing a first unloaded sliding section of the unloaded sliding surface which itself encompasses the first injection pocket also in a U-shape in circumferential direction, especially with lands extending on both lateral sides of the first injection pocket. This also favors advantageous fluidic communication in circumferential direction.

In particular, the present invention is based on the concept of (relatively) large lateral circumferential recesses on each side of the bearing. Preferably, these radial recesses may continue well over 180° of circumferential extension. Preferably, any evacuation points provided within this or these radial recesses are provided in the section of the unloaded sliding surface, especially at a circumferential position of about 70-110°, i.e., ca. at a quarter revolution (especially within the first quarter of the complete circumference or at the transition from first to second quarter of the complete circumference).

According to an embodiment of the invention, in axial direction the first and second injection pockets are arranged in centered manner with respect to the absolute axial length of the hydrodynamic bearing or of the unloaded/loaded sliding surface, especially also arranged in centered manner with respect to each other. This also favors symmetric properties in axial direction.

According to an embodiment of the invention at least the active area of the loaded sliding surface comprises lands arranged axially laterally of the second injection pocket, wherein the lands provide a continuous/continuity area between the active areas of the unloaded and loaded sliding surfaces. This also favors advantageous fluidic communication in circumferential direction.

According to an embodiment of the invention the active areas of the unloaded and loaded sliding surfaces comprise first and second lands arranged axially laterally of the first and second injection pockets. This also provides for a (fluidic) transition area between the unloaded and the loaded sliding surfaces.

According to an embodiment of the invention, in circumferential direction the first injection pocket is arranged downstream offset from a starting line of the unloaded sliding surface, especially with a circumferential downstream offset of at least 20°, especially with a downstream offset of maximum 60°. This may advantageously enhance stability, especially due to considerably reduced risk of cavitation. In particular, the respective starting line can be defined by the beginning of a bearing shell of the hydrodynamic bearing.

According to an embodiment of the invention, in circumferential direction the first injection pocket is larger than the second injection pocket, especially larger about at least factor 2. This may also ensure favorable fluid flow (mass flux, throughput).

According to an embodiment of the invention, in axial (longitudinal) direction the first injection pocket is shorter than the second injection pocket, especially shorter about at least factor 0.6. This may also favor an advantageous design especially in context with advantageous U-shape of active area and relatively narrow active area.

According to an embodiment of the invention, in circumferential direction the second injection pocket is arranged (directly) at a starting line of the loaded sliding surface, especially arranged in parallel thereto. This also favors exertion of (fluidic) influence on bearing properties via said second injection pocket at a favorable circumferential position. For example, the loaded sliding surface is provided by a shell (especially by one of two half shells) of the bearing, and the second injection pocket is arranged (directly) at the upstream front side of that shell.

According to an embodiment of the invention at least one fluid evacuation point is provided at/within the at least one radial recess, especially in a section downstream of the first injection pocket, especially within a groove arranged within the radial recess. This also allows for exertion of influence/control on the fluidic properties along the sliding surfaces in a lateral area, in addition to fluid control provided via the two injection pockets. In particular, fluid flow can be directed from injection pockets to the evacuation points resp. to the groove(s).

According to an embodiment of the invention the at least one radial recess accommodates at least one groove extending in circumferential direction, especially two grooves, wherein the at least one fluid evacuation point is provided within the at least one groove. Fluid evacuation preferably is carried out in symmetrical manner on each lateral side of the unloaded sliding surface. Preferably, the grooves are only provided in a/the first half shell of the bearing and at a bottom section of the bearing.

According to an embodiment of the invention the at least one radial recess exhibits at least two areas or sections having a different radial clearance, wherein the section having a bigger radial clearance is preferably provided by the at least one groove. Radial clearance of the inactive areas is bigger than any minor radial clearance of the active area. The skilled person is able to optimize the exact amount of radial clearance of each inactive surface section, especially in order to allow for effective fluid evacuation also.

According to an embodiment of the invention evacuation of (old) fluid is exclusively carried out on lateral border areas requiring axial deflection of the fluid. In particular, evacuation points are exclusively provided within grooves which are arranged in lateral border areas and which extend in circumferential direction. Such a design also allows for reducing any risk of high pressure peaks which would be detrimental as to fluid film temperature and efficiency.

According to an embodiment of the invention the at least one radial recess defines a/the starting line of the unloaded sliding surface. This arrangement also provides for a favorable design resp. construction of the bearing. In particular, the at least one radial recess may provide for an inactive area (or area with reduced activity) over the whole axial length of the bearing, which may also favor self/auto-adjustment of fluidic properties.

According to an embodiment of the invention the at least one radial recess provides for a frontal section (of the/an active area) upstream of the first injection pocket, the frontal section preferably having a rectangular shape, the frontal section preferably providing for a U-shaped active area (especially a first unloaded sliding section) encompassing the first injection pocket. This geometric configuration also favors fluid repartition/dispersion and dynamic stability, and the active area can be established/set in cascades resp. at predefined circumferential positions.

According to an embodiment of the invention, the at least one radial recess extends from the unloaded sliding surface into the loaded sliding surface over a (total) circumferential length of at least 180° [degrees, rotational position], preferably of at least 190° or 200°. This quite large circumferential extension also allows for guiding and directing the fluid along a great circumferential section, and the geometry and dimension of the active area can be optimized even further.

According to an embodiment of the invention the hydrodynamic bearing exhibits exactly two injection pockets which are in direct fluid communication with the active areas of the unloaded and loaded sliding surfaces and thus with a/the rotating element, both injection pockets preferably having a rectangular shape. This configuration also allows for fluid communication resp. fluidic interdependency of bearing characteristics based on two pockets and the respective provision of fluid (resp. based on the control of fluid supply at only two pockets).

According to an embodiment of the invention the injection pockets of the hydrodynamic bearing are arranged with respect to each other in such a manner that a/the bearing's fluid pressure profile has a parabolic shape, preferably at a circumference position at least equal to the circumferential point where the load is applied, e.g. 270° from a/the starting line of the unloaded sliding surface. Preferably, the maximum pressure point is located a little bit after (downstream) the point where the load is applied, between ca. 270° and 300°. Such a pressure profile has been shown to provide for favorable dynamic characteristics, wherein the arrangement of the at least one radial recess in combination with the relative position of the injection pockets facilitates occurrence of that parabolic pressure profile.

E.g., exactly two injection pockets are arranged with respect to each other in a circumferential distance of at least 110° and maximum 170°, preferably of approximately 130-160°. Placing the pockets in such a distance with respect to each other also allows for favorable repartition/dispersion of fluid.

According to an embodiment of the invention the injection pockets of the hydrodynamic bearing are arranged with respect to each other and with respect to the at least one recess in such a manner that a/the bearing's fluid pressure profile has a minimized ratio of maximum pressure to specific pressure, especially with the at least one recess circumferentially overlapping the second injection pocket and lands being arranged at both axial ends of the second injection pocket. In other words: The design is optimized in such a manner that the maximum film pressure is not too high (since high pressure evokes high temperature and high stress, i.e. increased deterioration of the sliding surface, especially in case the surfaces are made of white metal creeping already at relative low temperature). The value of the film pressure can be defined in terms of an absolute value or in terms of a ratio maximum pressure/specific pressure. According to the present invention, a favorable film pressure is achieved by a second injection pocket which is not very long in circumferential direction (y) and by a radial recess that covers, within the loaded sliding surface, only a/the zone of low pressure profile (PPL) (i.e., not the zones where the pressures are higher), and the active area of loaded sliding surface remains relatively large.

According to an embodiment of the invention the at least one radial recess of the hydrodynamic bearing extends in circumferential direction on both border areas of the hydrodynamic bearing of both the unloaded and of loaded sliding surface(s), preferably even further than a circumference position at least approximately corresponding to half the circumference of the bearing (circumferential extension preferably further than circumference position 180°, e.g. circumferential extension of about 200°-220° starting at the starting line of unloaded sliding surface). This design also favors an advantageous shape of the pressure profile.

According to an embodiment of the invention, between the first injection pocket and the second injection pocket, in circumferential direction, the hydrodynamic bearing exhibits a continuous/continuity area (in which no further injection pockets or evacuation cavities be provided). This also ensures minimized risk of cavitation.

According to an embodiment of the invention the sliding surfaces, starting from a/the starting line of the unloaded sliding surface in circumferential direction, exhibit a length which increases at least at three circumferential points, especially discretely in a cascade (triple-cascade). This manner of stepwise enlargement (in axial direction) of the active area has shown to provide for favorable (dynamic) bearing characteristics.

According to an embodiment of the invention an area of reduced activity (especially defined by the radial recess) of the unloaded sliding surface, starting from a/the starting line of the unloaded sliding surface in circumferential direction, exhibits a length which decreases at least at three circumferential points, especially discretely in a cascade. This concept also provides for a good ability for auto-adjustment of fluidic conditions and pressure profiles. Nonetheless, the skilled person can modify a discrete cascade design in order to provide more continuous transitions between respective surface sections, depending on specific demands for specific applications.

According to an embodiment of the invention the hydrodynamic bearing exhibits a plurality of sliding surfaces at least comprising said unloaded sliding surface and said loaded sliding surface, wherein said unloaded sliding surface and said loaded sliding surface are respectively provided by a bearing shell (preferably a half shell respectively), wherein the hydrodynamic bearing exhibits a plurality of areas of pressure on both said unloaded sliding surface and said loaded sliding surface, wherein activity of any of said areas of pressure preferably is defined by the radial position/elevation/height of respective sections of said unloaded sliding surface and said loaded sliding surface. This configuration also facilitates exerting influence on the characteristics by providing and geometrically shaping/adjusting/designing the at least one recess arranged upstream and laterally from the active area of the unloaded sliding surface and also (at least partly) extending laterally from the active area of the loaded sliding surface. Preferably, the first bearing shell is arranged below the rotating element, and the second bearing shell is arranged above the rotating element. Preferably, the first injection pocket is arranged in the first bearing shell, and the second injection pocket is arranged in the second bearing shell.

According to an embodiment of the invention in a top view on the sliding surfaces, a/the reduced active area of the unloaded sliding surface (i.e., the area which does not belong to the active area), which is preferably provided by the at least one recess, is U-shaped in the circumferential sliding direction downstream and borders the active area of the unloaded sliding surface and also partly the active area of the loaded sliding surface. This design also favors dispersion of fluid and enhanced dynamic stability of the bearing, wherein the active area can be enlarged in cascades in circumferential direction.

According to an embodiment of the invention in a top view on the sliding surfaces, the active area of the unloaded sliding surface is T-shaped (apart from the area encompassed by the first injection pocket) having a first substantially rectangular sliding section and (in the circumferential sliding direction further downstream) a second substantially rectangular sliding section having a greater axial length and also a greater circumferential extension than the first sliding section, wherein the first injection pocket is arranged in said first sliding section, and wherein also the active area of the loaded sliding surface is T-shaped (apart from the area encompassed by the second injection pocket) having a first substantially rectangular sliding section and (in the circumferential sliding direction further downstream) a second substantially rectangular sliding section having a greater length and also a circumferential extension than said first sliding section of the loaded sliding surface, wherein the second injection pocket is arranged in said first sliding section of the loaded sliding surface. This configuration also facilitates fluidic control of the unloaded and loaded sections via the first and second pocket, respectively.

The above mentioned object of the present invention is also solved by a gearbox exhibiting at least one hydrodynamic bearing as described above, wherein the gearbox preferably is configured for turbo applications requiring at least 60 m/s of journal velocity. Such a configuration provides for above mentioned advantages.

The above mentioned object of the present invention is also solved by use of a hydrodynamic bearing as described above in a rotating machine, especially in a gearbox, especially in a turbo gearbox, (e.g. in a turbo gearbox configured for high-load applications and configured for at least 60 m/s of journal velocity, wherein the hydrodynamic bearing accommodates and supports a rotating element, especially a shaft of a power train, wherein the hydrodynamic bearing is coupled to at least one pressure line for fluid injection. Such a configuration provides for above mentioned advantages. The pressure line can be provided with the gearbox or with/by other components of a power train or any further system component(s) interacting with the gearbox.

BRIEF DESCRIPTION OF THE DRAWINGS

In the following, the invention is explained in more detail with reference to the attached drawings, using preferred design examples. The word figure is abbreviated in the drawings as Fig. The drawings show in FIG. 1A, 1B, 1C, 1D, 1E in different views a hydrodynamic bearing according to a preferred design example of the present invention;

FIG. 2A, 2B, 20 in three schematic top sectional views the sliding surfaces of a hydrodynamic bearing according to design examples of the invention, wherein the complete circumference is illustrated in the top sectional view, respectively;

DETAILED DESCRIPTION OF DESIGN EXAMPLES

Figure 1A:
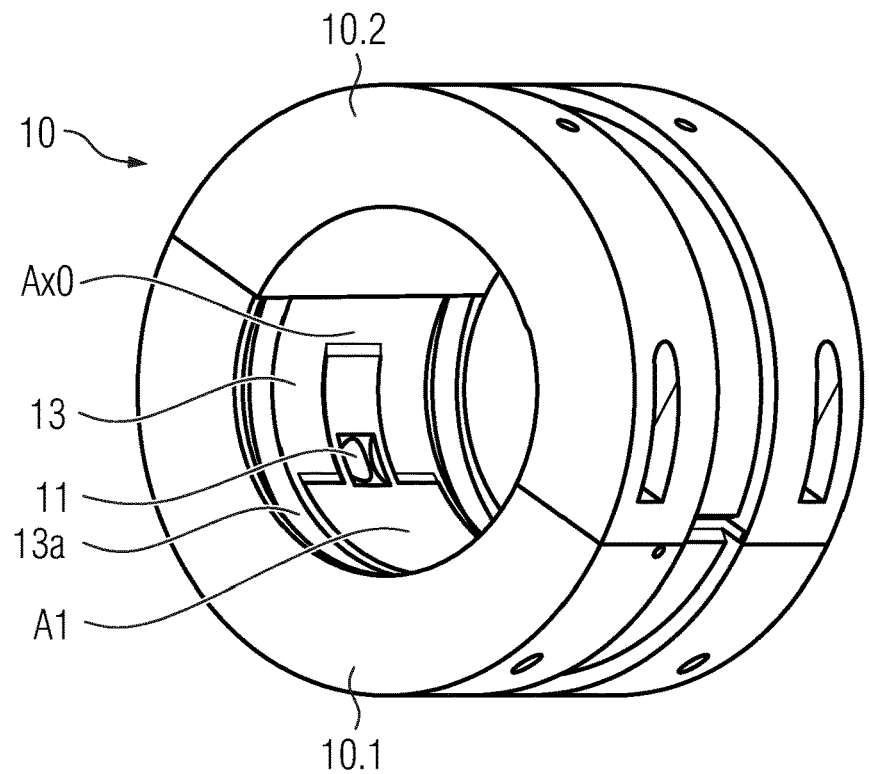

The described design examples are only examples which can be modified and/or supplemented in many ways within the scope of the claims. Each feature described for a/the specific design example can be used independently or in combination with other features in any other design example. Each feature described for the design example of a particular claim category can also be used in a corresponding way in a design example of another claim category. First, the elements and items shown in the figures are described in general, and a specific description is provided in context with individual figures.

A hydrodynamic bearing 10, especially plain bearing or journal bearing, accommodates and supports a rotating element 1 (shaft), e.g. in a gearbox 3, especially in turbo applications. Fluid F (especially oil) is supplied to the bearing via at least one pressure line/pipe 5 for fluid injection. In particular, the hydrodynamic bearing 10 may exhibit at least two shells, e.g. a first bearing shell 10.1 and a second bearing shell 10.2. In circumferential direction y, an unloaded sliding surface 10a is arranged upstream of a loaded sliding surface 10b (i.e., a surface facing the force at full load). In particular, the unloaded sliding surface 10a and the loaded sliding surface 10b may each encompass half a circumference, i.e. ca. 180°. A first injection pocket 11 is provided in the unloaded surface, and a second injection pocket 12 is provided in the loaded surface. A radial recess 13 is provided upstream of the first injection pocket 11 and laterally to/from the first and second injection pockets 11, 12, the radial recess 13 extending in circumferential direction and being arranged laterally of the active area A1 of the unloaded sliding surface and also partly laterally of the active area A2 of the loaded sliding surface. The at least one radial recess 13 provides for a corner/border area Ax which mainly extends along the unloaded sliding surface, and the at least one radial recess 13 also provides for a frontal section Ax0 of the corner/border area, the frontal section Ax0 being arranged on the frontal/upstream side of the active area A1 of the unloaded sliding surface, i.e., also on the frontal/upstream side of the first injection pocket 11. Thus, the active area A1 only begins at/with a circumferential offset YA1 further downstream of a/the starting line Y1 of the unloaded sliding surface, and the first injection pocket 11 only begins at/with a circumferential offset Y11 further downstream of the starting line Y1 of the unloaded sliding surface.

Fluid evacuation points P can be provided within the radial recess 13, especially within its sections extending in circumferential direction laterally of the active area A1 of the unloaded sliding surface.

In the following, specific regions/sections of the sliding surfaces 10a, 10b are described in more detail: The active area A1 of the unloaded sliding surface 10a exhibits a first unloaded sliding section A1a (rectangular land leading to the first injection pocket) and a second unloaded sliding section A1b arranged downstream of the first unloaded sliding section A1a and downstream of the first injection pocket 11, wherein first lands A1c laterally extending along the first injection pocket 11 connect the first unloaded sliding section A1a with/to the second unloaded sliding section A1b. The axial extension A1x of the first unloaded sliding section A1a is greater than the axial extension of the first injection pocket 11, but considerably smaller than the axial extension A1x' of the second unloaded sliding section A1b.

The active area A2 of the loaded sliding surface 10b exhibits a first loaded sliding section A2a and a second loaded sliding section A2b arranged downstream of the first loaded sliding section A2a, wherein both loaded sliding sections A2a, A2b are arranged downstream of the second injection pocket 12, wherein second lands A2c laterally extending along the second injection pocket 12 connect the second unloaded sliding section A1b with/to the first loaded sliding section A2a. The axial extension A2x of the first loaded sliding section A2a is greater than the axial extension of the second injection pocket 12, but considerably smaller than the axial extension A2x' of the second loaded sliding section A2b.

A continuity area Ay extending from first to second injection pockets 11, 12 (without any injection pocket resp. evacuation point being arranged therein) also circumferentially extends also beyond the second injection pocket 12, namely via second lands A2c, which is illustrated in FIG. 2B (no interruption of that continuity area Ay even up to the end of the loaded sliding surface 10b resp. its active area A2).

The first injection pocket 11 preferably ends/terminates at a circumferential positions corresponding to the transition from first to second unloaded sliding section A1a, A1b (namely corresponding to circumferential position y2). In contrast to the configuration of the unloaded sliding surface A1, the loaded sliding surface A2 exhibits a continuity area Ay2a within the first loaded sliding section A2a downstream of the second injection pocket 12. I.e., the second injection pocket 12 preferably ends/terminates at a circumferential positions well upstream of the transition from first to second loaded sliding section A2a, A2b (namely upstream to circumferential position y3).

The pressure profile provided by the configuration described herein is designated by reference sign PP, wherein PPL reference sign designates a low pressure zone.

To sum up, the relative position XY11 of the first injection pocket 11 within the active area A1 of the unloaded surface 10a can be described/designates as U-shaped arrangement (in circumferential direction), wherein both a U-shaped arrangement of the frontal section of the radial recess 13 encompassing the first unloaded sliding section A1a of the unloaded sliding surface and also a U-shaped arrangement of the first unloaded sliding section A1a encompassing the first injection pocket 11 are provided, wherein lands A1c extend on both lateral sides of the first injection pocket.

Reference sign Y2 designates the starting line of the loaded sliding surface A2, wherein the second injection pocket 12 is arranged at that starting line Y2 in parallel to/with that starting line Y2.

The axial length of first and second lands A1c, A2c is designated by reference sign Δx, illustrating an axial offset resp. an axial continuity area/section without any injection pocket or evacuation point.

Reference sign YY designates a complete circumference/cycle (length according to 360° of inner lateral surface/area), and p designates a/the film/fluid pressure, especially in [bar], and r designates the radial direction, x designates the axial (longitudinal) direction, and y designates the circumferential direction/sliding direction, especially in [°] of 360°. Reference signs y1, y2, y3 each designate a circumferential point resp. circumference position of an increasing axial length (resp. broadness/width) of the active area of the sliding surface(s).

In the following, specific aspects of the present invention are described in more detail by individually referring to the figures.

FIG. 1 show a hydrodynamic bearing 10 exhibiting two half shells 10.1, 10.2, namely a first half shell 10.1 (especially the half shell being the unloaded shell in operational state) providing for the unloaded sliding surface 10a, and a second half shell 10.2 (especially the half shell being the loaded shell in operational state) providing for the loaded sliding surface 10b. Lateral recesses 13 circumferentially extend along the first injection pocket 11, and the first half shell 10.1 exhibits a recess section 13 which is arranged upstream of the first injection pocket 11, providing for a frontal section Ax0 of reduced activity. The first half shell 10.1 also provides for several fluid evacuation points P which lead to each of the two circumferentially extending sections of the recess 13. In particular, the circumferential sections of the recess 13 being arranged in the first half shell 10.1 may have a greater depth (especially provided by a groove or corrugation) than the further sections of the recess 13. This specific configuration of the recess 13 extending laterally from the active unloaded area A1 can be designed depending on each individual application, especially depending on desired fluid flow rates or the like (e.g. also depending on the total axial length of the bearing).

In particular, FIG. 1A illustrates the relative circumferential position of the first injection pocket 11 with respect to the first and second unloaded sliding sections A1a, A1b.

Figure 1B:
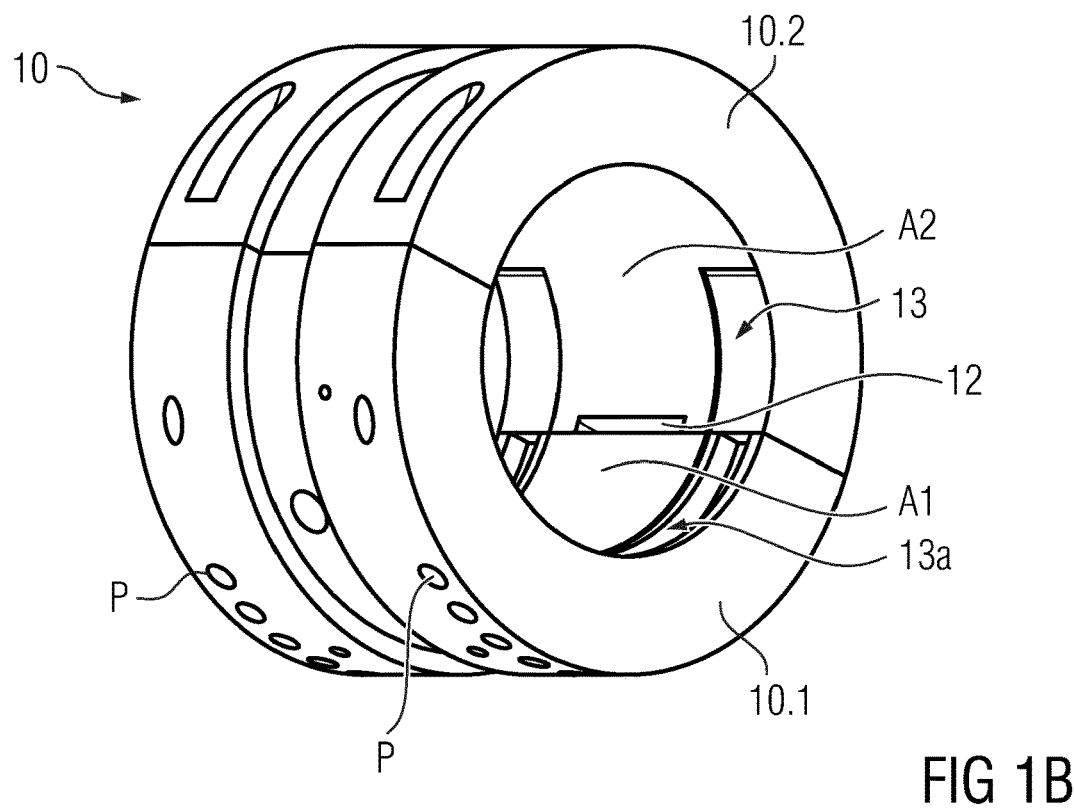

In particular, FIG. 1B illustrates the relative circumferential position of the second injection pocket 12 with respect to the starting line Y2 of the loaded sliding surface 10b and with respect to the recesses 13 circumferentially overlapping/extending in the loaded sliding surface area.

Figure 1C:
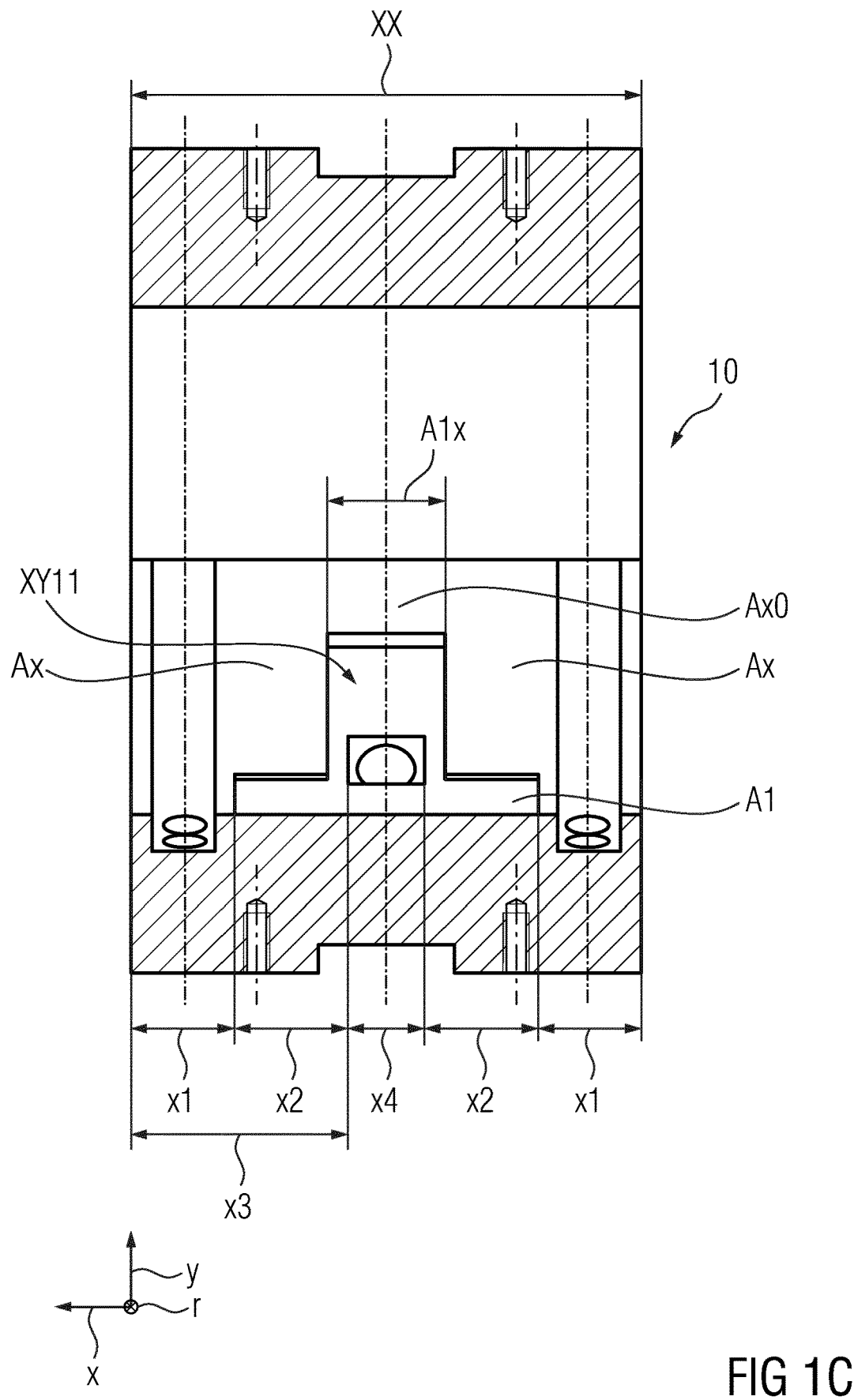

In particular, by referring to the total axial extension XX (complete axial length) of the bearing, FIG. 1C illustrates the following axial extensions x1, x2, x3, x4, A1x of respective unloaded surface sections, especially according to the following factors (at least approximately): $0.1*XX<x1<0.3*XX$; $0.1*XX<x2<0.3*XX$; $0.15*XX<A1x<0.45*XX$; $0.3*XX<x3<0.45*XX$; $0.1*XX<x4<0.4*XX$; (excluding x1 and x2 being simultaneously at their maximum/minimum value). Alternatively or in addition, the relative size can also be dependent on the axial extension x4 of the first injection pocket 11, especially according to the following factors (at least approximately): $0.25*x4<x1<3*x4$ (especially about factor $1.5*x4$); $0.25*x4<x2<3*x4$ (especially about factor $1.5*x4$); $1*x4<x3<4.5*x4$ (especially about factor $2.5*x4$); $1*x4<A1x<2*x4$ (especially about factor $1.5*x4$). The skilled person may choose the preferred reference to XX and/or to x4.

Figure 1D:
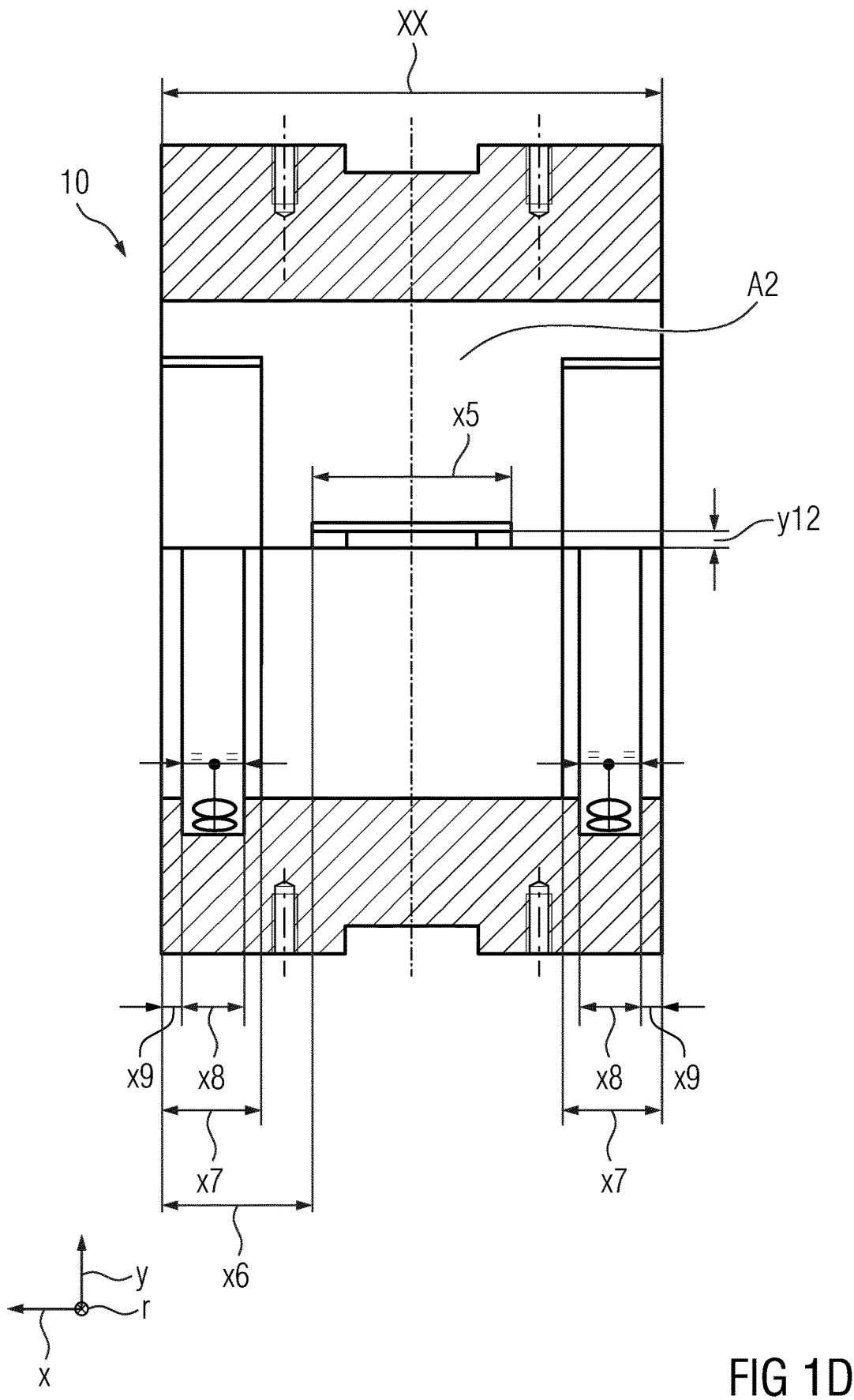

In particular, by referring to the total axial extension XX (complete axial length) of the bearing, FIG. 1D illustrates the following axial extensions x5, x6, x7, x8, x9 of respective unloaded and loaded surface sections, especially according to the following factors (at least approximately): $0.3*XX<x5<0.6*XX$; $0.2*XX<x6<0.35*XX$; $0.1*XX<x7<0.3*XX$;

The axial extensions x8 and x9 can be dependent on the axial extension x7 according to the following factors (at least approximately): $0.5*x7<x8<0.7*x7$; $0.15*x7<x9<0.25*x7$;

Alternatively or in addition, the relative size can also be dependent on the axial extension x5 of the second injection pocket 12, especially according to the following factors (at least approximately): $0.5*x5<x6<1*x5$ (especially about factor $0.75*x5$); $0.2*x5<x7<1.0*x5$ (especially about factor $0.5*x5$); $0.2*x5<x8<0.5*x5$ (especially about factor $0.3*x5$); $0.05*x5<x9<0.2*x5$ (especially about factor $0.1*x5$). The skilled person may choose the preferred reference to XX and/or to x5.

As shown in FIG. 1D, reference sign y12 designates the circumferential extension of second injection pocket 12. Preferably, the ratio of axial length x5 to circumferential extension y12 of the second injection pocket 12 (ratio x5:y12) is within the range of 6 to 15, especially about 10.

Figure 1E:
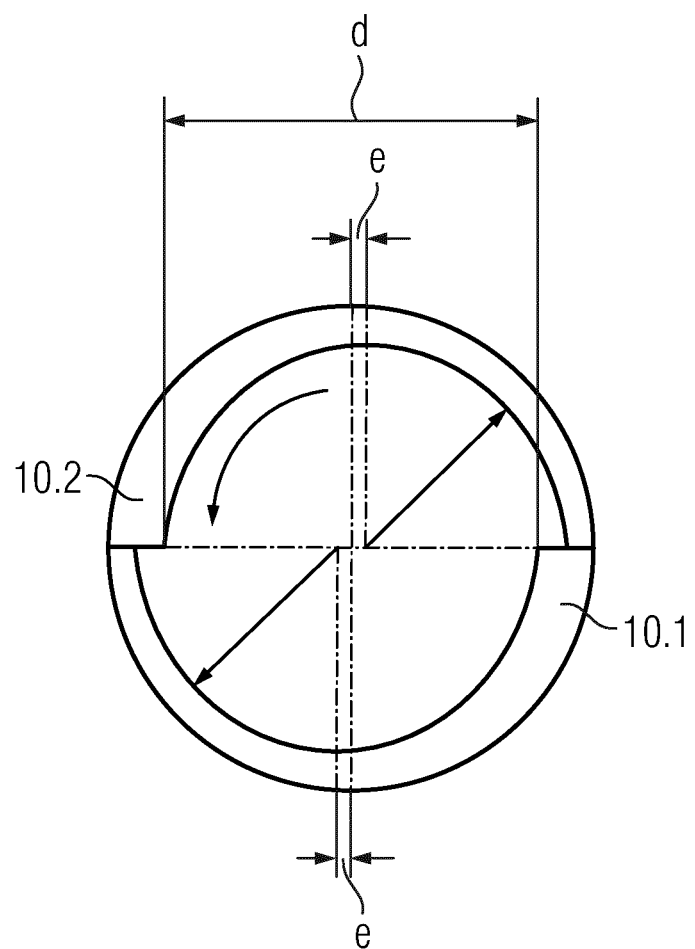

As shown in FIG. 1E, in each shell 10.1, 10.2, optionally, an eccentricity (e) of the center of the sliding surface can be provided, especially in order to define the unloaded and loaded sliding sections more clearly and do allow for more distinguished fluid flow of both pressurized "new" fluid and "used" fluid which should be evacuated via evacuation points P. Eccentricity, and thus, diameter (d) can specifically be designed with respect to the diameter of the rotating element and/or operation conditions and/or required performance (especially stiffness).

Figure 2A:
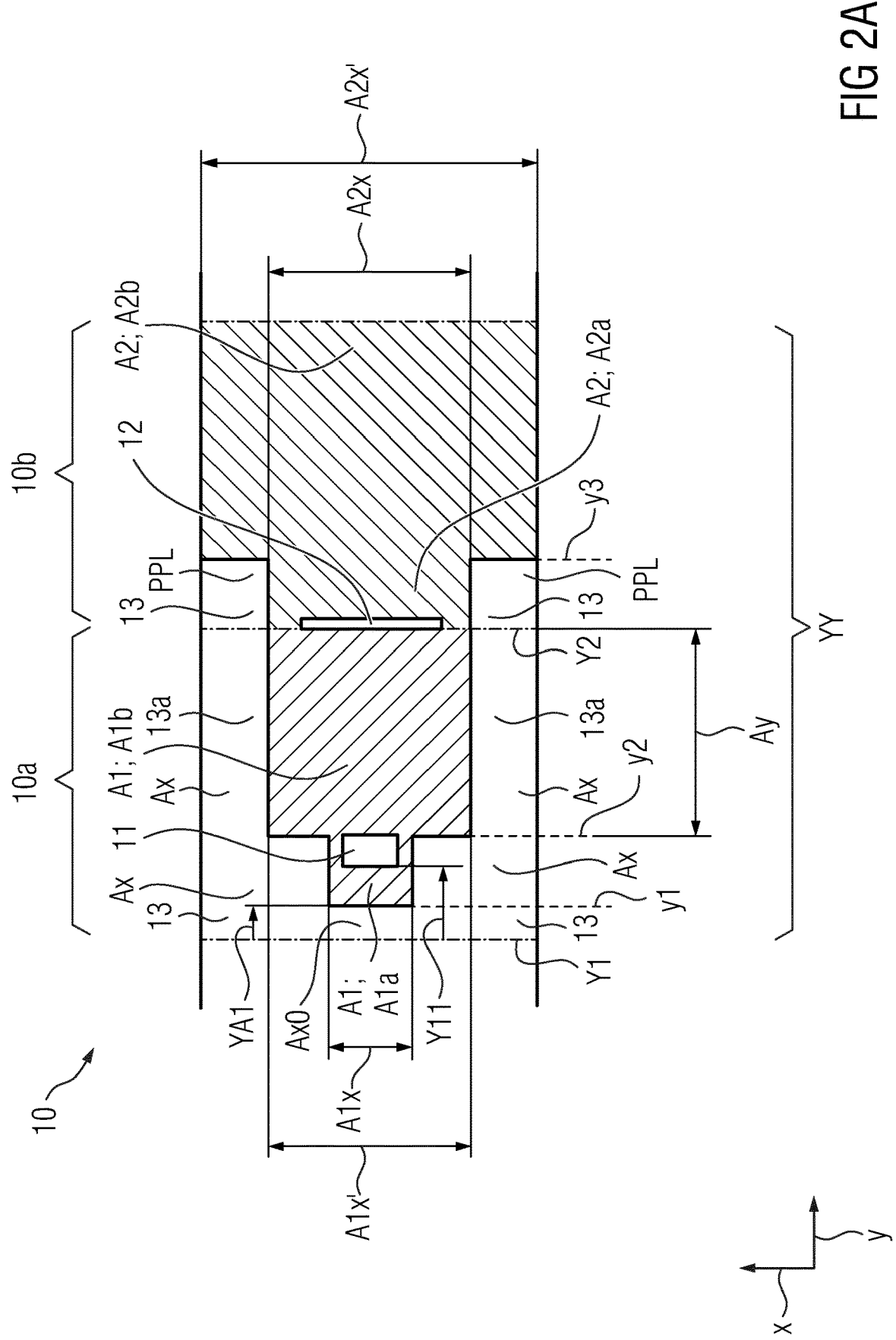

FIG. 2 further illustrate relative positions and dimensions of surface sections, in schematic manner. In FIG. 2A, 2B, a/the reduced active area is illustrated by blank areas, wherein the active areas of the unloaded and loaded sliding surfaces are illustrated by dotted areas.

In particular, FIG. 2A shows the recess 13 (double U-shape recess with two pairs of opposed flanks resp. circumferential sections), wherein the recess 13 extends both laterally (thereby overlapping the second starting line Y2) and axially, providing for a/the frontal (quite passive) section Ax0 and also providing for a/the triple cascade of increasing active area being enlarged (in its axial extension) at three circumferential points y1, y2, y3.

In particular, FIG. 2B illustrates the relative positions of first and second lands A1c, A2c laterally from respective injection pocket 11, 12, and also, the circumferential offset YA1, Y11 is described by referring to the starting lines Y1, Y2 and also by referring to the circumference position of increasing length (resp. broadness/width) of the active area of the unloaded and loaded sliding surfaces.

The reduced active area Ax of the unloaded sliding surface 10a also allows for reduced power losses. The reduced active area Ax of the loaded sliding surface 10b is arranged in a region of low pressure PPL.

The present invention is also based on the following concept and findings: At the first injection pocket 11, a first central inward flow of fluid is supplied directly to the active area of the unloaded surface, and at the second injection pocket 12, a second central inward flow of fluid is supplied directly to the active area of the loaded surface, wherein both injection pockets 11, 12 are arranged centrally (with respect to the axial direction x), and wherein both injection pockets 11, 12 are (fluidically) coupled to active area sections further upstream, especially via lands A1c. A2c. The first injection pocket 11 is arranged with circumferential offset YA1 in a distance to the beginning (starting line) of the unloaded sliding surface, which also allows for preventing cavitation especially in the middle of the unloaded sliding surface. The first injection pocket 11 is (relatively) large in circumferential sliding direction y, which also allows for good (relatively large) fluid flow rates. The first injection pocket 11 is (relatively) short in axial direction x, which also allows for a design having a (relatively) large area Ax of reduced activity. The second injection pocket 12 is arranged directly at the beginning (starting line) of the loaded sliding surface, which also allows for maximizing the active area and for reducing maximum temperature and maximum pressure. The second injection pocket 12 is (relatively) short in circumferential sliding direction y, which also allows for maximizing active area. The second injection pocket 12 is (relatively) long in axial direction x, which also allows for good lubrication characteristics. The lands A1c, A2c also allow for fluid communication between the unloaded and loaded sliding surfaces and may enhance dynamic stability. Also, these lands A1c, A2c can ensure continuity of bearing profile between the unloaded and loaded sliding surfaces.

In particular, FIG. 2C illustrates an alternative contour of the border line bordering the active areas A1, A2a; i.e., the rectangular shape illustrated in FIG. 2A, 2B can also be made round such that any discrete edges are rounded. Departing from the embodiment shown in FIG. 2A, 2B, the skilled person is able to provide such design alternatives for specific applications, in order to further improve efficiency and fluid flow. It should be noted that the radius resp. the curvatures of the border line is/are illustrated in an excessively exaggerated manner in FIG. 2C, in order to facilitate comprehension of any such design alternatives resp. variations in geometry of each of the active area sections.

FIG. 3 show an advantageous pressure profile PP exhibiting low pressure zones PPL and having a parabolic shape with a peak residing approximately at half the circumference of the loaded sliding surface, approximately a little more than 270°.

Figure 3A:
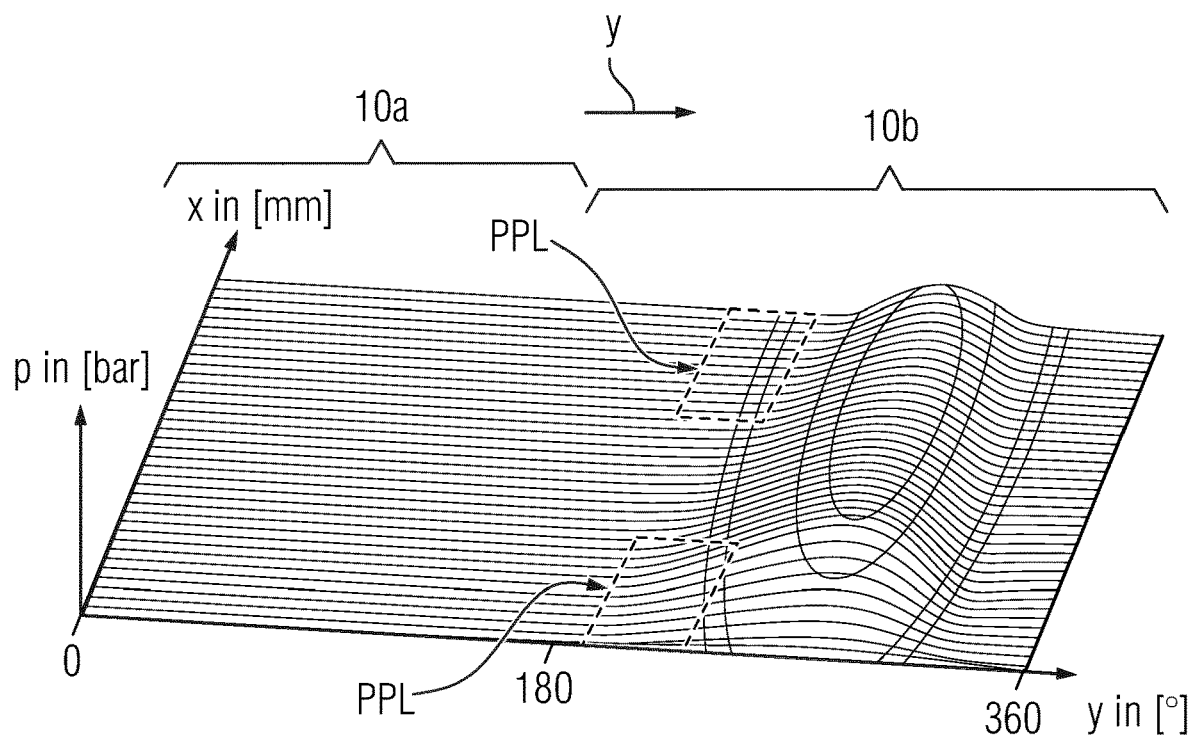
FIG. 3A, 3B a schematic illustration of a pressure profile provided by a hydrodynamic bearing according design examples of the invention, respectively.

In particular, FIG. 3A shows that the main pressure peak increases and decreases in quite homogeneous manner both in circumferential direction and in axial direction.

Figure 3B:
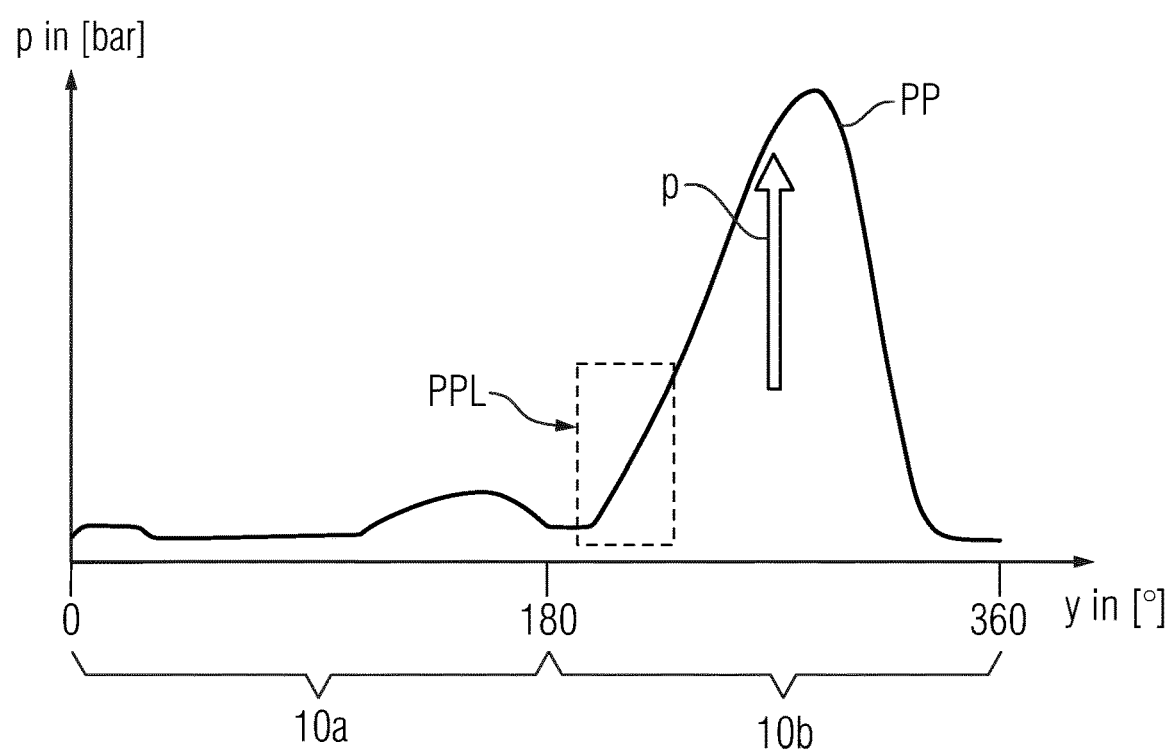

In particular, FIG. 3B shows a first increase (relatively small pressure wave) at about 90° to 180°, and at a circumferential point between ca. 270° and 300°, the main pressure peak (corresponding to pressure in loaded sliding surface area) provides for an advantageous parabolic shape of the pressure profile.

Figure 4:
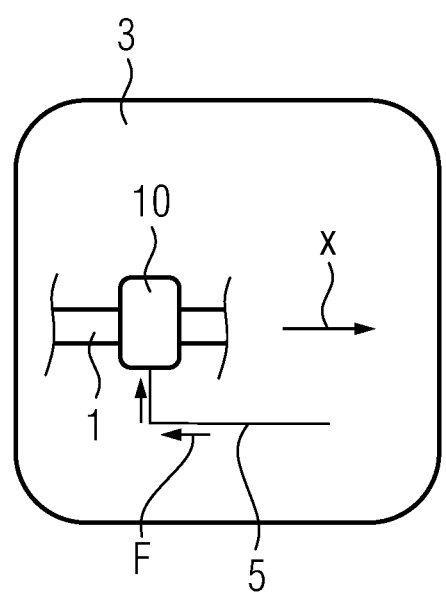
FIG. 4 a schematic illustration of a gearbox comprising at least one hydrodynamic bearing according to design examples of the invention.

FIG. 4 illustrates further components of a gearbox arrangement 3 exhibiting at least one hydrodynamic bearing 10 according to the present invention, wherein the rotating element 1 is part of a power train especially in turbo applications.

Pressure line 5 may provide for fluid for both injection pockets 11, 12 or individually for each of first and second injection pockets (wherein several pressure lines 5 may be provided); also, fluid evacuated from evacuation points P can be evacuated via such a line 5, individually or in conjunction with provision of fluid to injection pockets 11, 12. Thus, pressure line 5 (or evacuation line) shown in FIG. 4 should be considered as schematic example only; the skilled person can choose an appropriate design for provision of pressure/fluid and evacuation of fluid via several lines according to each individual application.

FIG. 5 illustrate the flow of fluid F and the active surface area having minimal radial clearances as well as the non-active surface areas (resp. the at least one radial recess) having relatively high radial clearance (especially at least factor 3 and up to e.g. factor 5 bigger than the low/minor clearance of the active area). At the outer shell surface, there is at least one canal or groove for fresh oil supply. Deep grooves 13a being arranged within radial recess 13 are provided for radial evacuation of "used" fluid, communicating with evacuation points P.

Figure 5A:
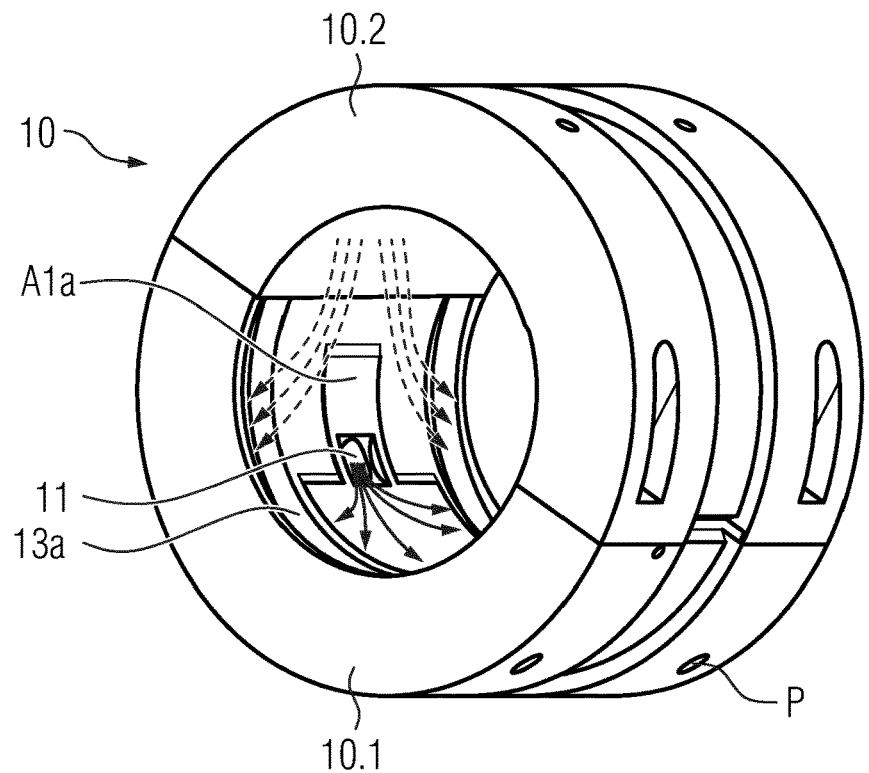
FIG. 5A, 5B in different perspective views in schematic illustration the fluid flow path in hydrodynamic bearings according to preferred design examples of the present invention.

In particular, FIG. 5A shows pressurized "new" fluid F being injected at the first injection pocket 11 in order to flow along active area section A1b, and "old" fluid being evacuated via inactive border areas Ax and via grooves 13a. In particular, the circumferential position of the first injection pocket within the first (half) shell 10.1 is preferably within the range of 40-60°, preferably at about 50° (about 25-30% of 180° or of the circumferential extension of the unloaded shell). Thus, apart from area A1a, that mainly inactive circumferential section (of about 10-15% of 360° circumference) allows for self-adjustment and good efficiency and provision of new fluid at a favorable relative position. The dotted line arrows indicate hot and "used" oil coming from the loaded sliding surface is directed to the grooves 13a at the beginning of the unloaded sliding surface resp. unloaded section of the shell. Continuous line arrows: Fresh and "new" oil supplied via the first injection pocket is provided to the sliding surface of the unloaded sliding surface.

Figure 5B:
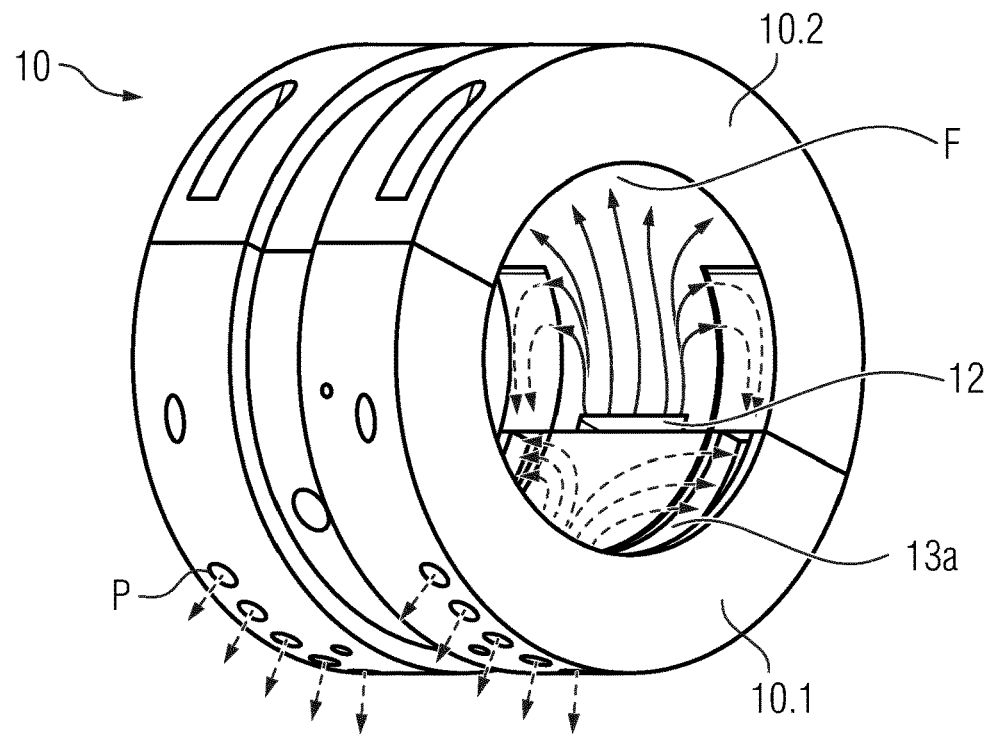

In particular, FIG. 5B shows pressurized "new" fluid F being injected at the second injection pocket 12 in order to flow along active area section A2a, A2b, and "old" fluid being evacuated via inactive border areas Ax and via grooves 13a (reflow). The dotted line arrows indicate hot and "used" resp. "old" oil coming from the unloaded sliding surface resp. half shell is directed to the grooves 13a at the end of the unloaded sliding section. The oil is ejected/evacuated radially from the grooves through the holes (evacuation points). Continuous line arrows: Fresh and "new" oil supplied via the second injection pocket is provided to the sliding surface of loaded sliding surface resp. half shell. This manner of oil injection also helps pushing the "used" oil into the grooves. A small fraction of that "new" oil may flow to the non active surfaces and may create a kind of small backflow back to the evacuation grooves arranged at the unloaded sliding section (cf. dashed line arrows).

While several aspects of the hydrodynamic bearing are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

REFERENCE LIST 1 rotating element
3 gearbox
5 pressure line/pipe for fluid injection
10 hydrodynamic bearing, especially plain bearing or journal bearing
10.1 first bearing shell, especially arranged below the rotating element
10.2 second bearing shell, especially arranged above the rotating element
11 (first) injection pocket in unloaded surface, especially in first bearing shell
12 (second) injection pocket in loaded surface, especially in second bearing shell
13 radial recess extending in circumferential direction and being arranged laterally of the active area of the sliding surface, optionally combined with evacuation points
13a groove
10a unloaded sliding surface
10b loaded sliding surface (facing the force at full load)
A1 active area of unloaded sliding surface
A1a first unloaded sliding section
A1b second unloaded sliding section
A1c first lands
A1x axial extension of first unloaded sliding section
A1x' axial extension of second unloaded sliding section
A2 active area of loaded sliding surface
A2a first loaded sliding section
A2b second loaded sliding section
A2c second lands
A2x axial extension of first loaded sliding section
A2x' axial extension of second loaded sliding section
Ax corner/border area especially of the unloaded sliding surface
Ax0 frontal section of the corner/border area
Ay continuity area without any evacuation point or injection pocket
Ay2a continuity area of first loaded sliding section downstream of second injection pocket
d diameter
e eccentricity
F fluid (resp. fluid flow direction)
P evacuation point
PP pressure profile
PPL low pressure zone
XX total axial extension (complete axial length)
XY11 relative position of first injection pocket within unloaded surface, especially in U-shaped arrangement
YA1 circumferential offset further downstream of active unloaded area from starting line
Y11 circumferential offset further downstream of injection pocket within unloaded surface
Y1 starting line of the unloaded sliding surface
Y2 starting line of the loaded sliding surface
YY complete circumference/cycle (length according to 360° of inner lateral surface/area)
p film/fluid pressure, especially in [bar]

r radial direction
x axial (longitudinal) direction
x1, x2, x3, x4 axial extension of respective unloaded surface section shown in FIG. 1C
x5, x6, x7, x8, x9 axial extension of respective un-/loaded section shown in FIG. 1D
Δx axial offset resp. axial continuity area/section without any injection pocket or evacuation point
y circumferential direction/sliding direction, especially in [°] of 360°
y1, y2, y3 circumferential point(s) resp. circumference position of increasing length (resp. broadness/width) of sliding surface
y12 circumferential extension of second injection pocket

What is claimed is:

1. A hydrodynamic bearing for a rotating element, the hydrodynamic bearing comprising:
   an unloaded sliding surface;
   a loaded sliding surface downstream of the unloaded sliding surface;
   a first injection pocket arranged within the unloaded sliding surface;
   a second injection pocket arranged within the loaded sliding surface;
   a radial recess arranged within both the unloaded sliding surface and the loaded sliding surface and extending in a circumferential direction such as to overlap both the first injection pocket and the second injection pocket in the circumferential direction, the radial recess defining or delimiting an active area of both the unloaded sliding surface and the loaded sliding surface,
   wherein each of the first and second injection pockets has an axial length which is smaller than an axial extension of the active area upstream or downstream in a corresponding circumferential sliding section of the unloaded sliding surface and loaded sliding surface in which the first and second injection pockets respectively are arranged, and
   wherein the radial recess provides for fluid communication between an evacuation point and the unloaded sliding surface.

2. The hydrodynamic bearing according to claim 1, wherein both the first and second injection pockets are designed to provide new fluid for the hydrodynamic bearing within the active area such that an old fluid stream coming from circumferential sections further upstream is divided upstream of the respective one of the first and second injection pockets and is directed to both lateral sides; and/or wherein upstream of the first injection pocket, the active area comprises a first unloaded sliding section; and/or wherein the first and second injection pockets are designed to axially deflect old fluid for evacuation of the old fluid via the recess in an operational state, wherein the old fluid is squeezed by new fluid injected via the first and second injection pockets.

3. The hydrodynamic bearing according to claim 1, wherein the radial recess is arranged laterally on both sides of the first and second injection pockets; and/or wherein the radial recess is provided by one single coherent recess and exhibiting a U-shape in the circumferential direction downstream and bordering at least the unloaded sliding surface and also partly the loaded sliding surface; and/or wherein the radial recess provides for fluid communication between the evacuation point and the unloaded sliding surface; and/or wherein in conjunction with the radial recess, a relative position of the first injection pocket within the unloaded sliding surface defines a U-shaped arrangement of a frontal section of the radial recess encompassing a first unloaded sliding section of the unloaded sliding surface which itself encompasses the first injection pocket also in a U-shape in the circumferential direction.

4. The hydrodynamic bearing according to claim 1, wherein in an axial direction the first and second injection pockets are arranged in a centered manner with respect to an absolute axial length of the hydrodynamic bearing or of the unloaded and loaded sliding surfaces; and/or wherein the active area of the loaded sliding surface comprises lands arranged axially laterally of the second injection pocket to provide a continuous/continuity area between the active areas of the unloaded and loaded sliding surfaces; and/or wherein the active areas of the unloaded and loaded sliding surfaces comprise first and second lands arranged axially laterally of the first and second injection pockets.

5. The hydrodynamic bearing according to claim 1, wherein in the circumferential direction the first injection pocket is arranged downstream offset from a starting line of the unloaded sliding surface; and/or wherein in the circumferential direction the first injection pocket is larger than the second injection pocket; and/or wherein in an axial direction the first injection pocket is shorter than the second injection pocket; and/or wherein in the circumferential direction the second injection pocket is arranged at a starting line of the loaded sliding surface.

6. The hydrodynamic bearing according to claim 5, wherein the first injection pocket is arranged downstream offset from the starting line of the unloaded sliding surface with a circumferential downstream offset of at least 20° and a maximum of 60°.

7. The hydrodynamic bearing according to claim 5, wherein in the circumferential direction the first injection pocket is larger than the second injection pocket about at least factor 2.

8. The hydrodynamic bearing according to claim 5, wherein in an axial direction the first injection pocket is shorter than the second injection pocket about at least factor 0.6.

9. The hydrodynamic bearing according to claim 1, wherein the evacuation point is provided at/within the radial recess; and/or wherein the radial recess accommodates a groove extending in the circumferential direction, wherein the evacuation point is provided within the groove; and/or wherein the radial recess exhibits at least two areas or sections having a different radial clearance, wherein the section having a bigger radial clearance is provided by the groove; and/or wherein evacuation of fluid is exclusively carried out on lateral border areas requiring axial deflection of the fluid.

10. The hydrodynamic bearing according to claim 1, wherein the radial recess defines a starting line of the unloaded sliding surface; and/or wherein the radial recess provides for a frontal section upstream of the first injection pocket, the frontal section providing for a U-shaped configuration of the active area encompassing the first injection pocket; and/or wherein the radial recess extends from the unloaded sliding surface to the loaded sliding surface over a circumferential length of at least 180°.

11. The hydrodynamic bearing according to claim 1, wherein the hydrodynamic bearing comprises exactly two injection pockets, one of the two injection pockets being said first injection pocket and the other one of the two injection pockets being said second injection pocket, with the first and second injection pockets in direct fluid communication with the active areas of the unloaded and loaded sliding surfaces and thus with a rotating element.

12. The hydrodynamic bearing according to claim 1, wherein the radial recess extends in the circumferential direction on both sides of the hydrodynamic bearing of both the unloaded sliding surface and the loaded sliding surface.

13. The hydrodynamic bearing according to claim 1, wherein between the first injection pocket and the second injection pocket, in the circumferential direction, the hydrodynamic bearing exhibits a continuous/continuity area.

14. The hydrodynamic bearing according to claim 1, wherein the unloaded and loaded sliding surfaces, starting from a starting line of the unloaded sliding surface in the circumferential direction, exhibit an axial length which increases at least at two circumferential points.

15. The hydrodynamic bearing according to claim 1, wherein in a top view on the unloaded and loaded sliding surfaces, the active area of the unloaded sliding surface is T-shaped having a first substantially rectangular sliding section and a second substantially rectangular sliding section having a greater axial length and circumferential extension than the first sliding section, wherein the first injection pocket is arranged in the first sliding section, and the active area of the loaded sliding surface is T-shaped having a first substantially rectangular sliding section and a second substantially rectangular sliding section having a greater axial length and circumferential extension than the first sliding section of the loaded sliding surface, wherein the second injection pocket is arranged in the first sliding section of the loaded sliding surface.

16. The hydrodynamic bearing according to claim 1 for use in a rotating machine, wherein the hydrodynamic bearing accommodates and supports a rotating element, wherein the hydrodynamic bearing is coupled to a pressure line for fluid injection.

17. A gearbox, comprising a hydrodynamic bearing as set forth in claim 1, for use in a turbo application requiring at least 60 m/s of journal velocity.

\* \* \* \* \*